Feb. 18, 1947. T. A. DAVIDSSON 2,416,160
SIGNALING DEVICE FOR CYCLES
Filed Dec. 18, 1944
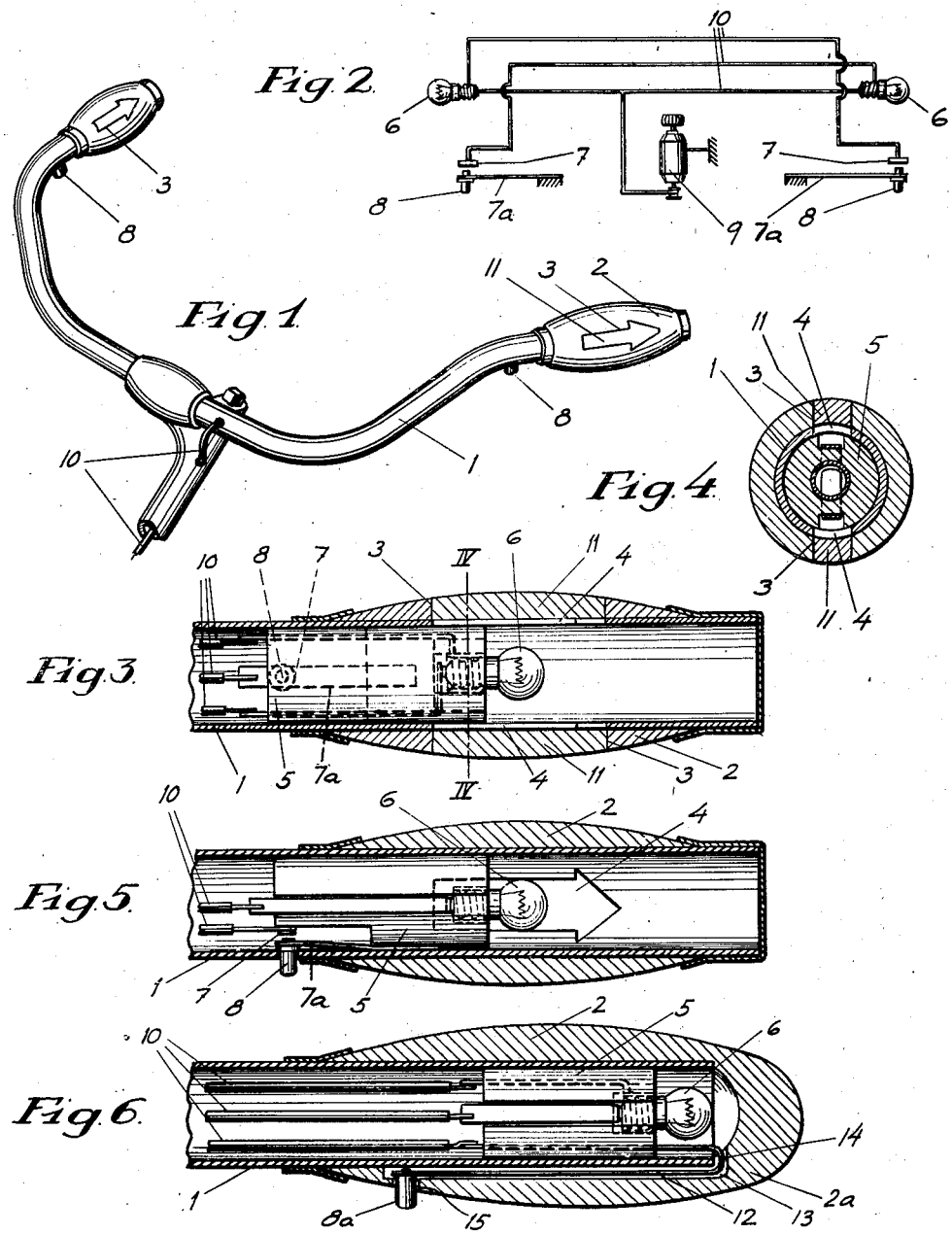
INVENTOR.
Tage A. Davidsson.
BY
William C. Linton.
ATTORNEY.

Patented Feb. 18, 1947

2,416,160

UNITED STATES PATENT OFFICE 2,416,160

SIGNALING DEVICE FOR CYCLES

Tage Arnold Davidsson, Edhem, Lerum, Sweden

Application December 18, 1944, Serial No. 568,713
In Sweden October 15, 1941

6 Claims. (Cl. 177—329)

The present invention relates to signaling devices for cycles by means of which the driver gives notice of his intention to turn his vehicle to the right or to the left by means of electric lamps provided at the ends of the handle bar.

The main object of the invention is the provision of a signaling device of the kind referred to which is simple in construction and well protected against damage.

Some embodiments of the invention are shown by way of example in the accompanying drawing, in which Figure 1 is a perspective view of a handle bar provided with a signaling device according to the invention; Figure 2 is a diagram of connection; Figure 3 is a longitudinal section through the one end portion of the handle bar with grip, lamp and switch; Figure 4 is a cross section through the handle bar and the grip along the line IV—IV in Figure 3, and Figures 5 and 6 longitudinal sections through modified embodiments of the invention.

Referring to Figures 1–4 I denotes the tube-shaped handle bar to each end portion of which a socket-shaped grip 2 is secured in a suitable manner. Each grip is provided with side openings 3 situated in front of side openings 4 in the handle bar 1. In each end portion of the handle bar there is inserted and in a suitable manner fastened a cylindrical holder 5 for an electric lamp 6 situated in front of the side openings 4. The lamp holder 5 is also provided with a switch the fixed contact member of which is indicated by 7 and the movable contact member of which comprises a metal spring 7a which contacts the inside of the handle bar and which is actuated by a push button 8 projecting through a side opening in the handle bar near the grip. The source of current for the lamps can be a dynamo 9 which is driven by the cycle and the one terminal of which is electrically connected to the front fork of the cycle. As clearly appears from Figure 2 the switches are so coupled in the connections 10 from the dynamo to the lamps that when the push button 8 at the left grip 2 is actuated the lamp 6 in the right end portion of the handle bar is lighted, and vice versa. Thus, the driver can make double signals when he intends to change the direction of movement of the vehicle, on the one hand by stretching out the one arm and on the other hand by lighting the corresponding lamp 6 by means of the hand still holding the handle bar. It may be suitable to cover the openings 3 in the grips 2 with prisms or lenses 11 of a translucent and preferably coloured, f. i., red material.

The embodiment shown in Figure 5 differs from that shown in Figures 3 and 4 only in that respect that the grip 2 in its entirety is made of a translucent and strong material, f. i., red coloured Celluloid.

Also in the embodiment shown in Figure 6 the grip 2 in its entirety is made of a suitable, translucent, f. i., red coloured material. The socket-shaped grip 2 is provided with a bottom portion 2a exposed to the light from the lamp 6. The switch comprises a bow-shaped metal spring 14, which is connected to one of the connections 10. The free branch 12 of the spring 14 is situated outside the handle bar 1 in a longitudinal groove 13 at the inside of the grip 2 and is actuated by a push button 8a projecting through a side opening 15 in the grip 2. By means of this push button 8a the branch 12 can be brought to contact the handle bar 1 thus closing the circuit to the lamp 6 provided in the other grip 2 of the handle bar. The device shown in Figure 6 requires evidently no openings in the handle bar.

The invention is not limited to the embodiments described above and shown in the annexed drawing but may be varied in details without departing from the spirit of it.

I claim:

1. An electrical directional signaling device for cycles having a tubular handle bar, a socket permanently secured within said bar, a lamp mounted within said socket having a supply of electric energy, a switch for controlling the supply of electric energy to said lamp, a hand grip permanently secured to said bar for completely housing the lamp arranged therein and at least a portion of said hand grip being translucent whereby the light rays from said lamp may pass therethrough and emit therefrom.

2. An electrical signaling device for cycles having a tubular handle bar and the outer end of said bar being open, a socket permanently secured within the outer opened end of said bar, a lamp mounted within said socket, lead wires extending through said tubular handle bar for supplying electrical energy to said lamp, a switch for controlling the supply of electrical energy arranged within said bar and connected to said lead wires, a hand grip permanently secured to and extending over the outer opened end of said bar and a portion of said hand grip being translucent whereby the rays of light from said lamp may pass therethrough and be emitted therefrom.

3. An electrical signaling device of the character described comprising a tubular bar having its outer end open, a socket secured within said bar, a lamp mounted within said socket, lead wires extending through said bar for supplying electrical energy to said lamp, a translucent hand grip secured to and extending over the open end of said bar, a spring actuated switch arranged within said hand grip and connected to said lead wires for controlling the supply of electrical energy to said lamp and a push button mounted within said hand grip and connected to said spring actuated switch.

4. An electrical signaling device of the character described comprising a tubular bar having its outer end open, a socket permanently secured within said bar, a lamp mounted within said socket, lead wires extending through said tubular bar for connection with said lamp in supplying electrical energy thereto, a translucent hand grip permanently secured to and extending over the open end of said bar for completely housing the lamp arranged therein, a switch comprising a bow-shaped metal spring having one end connected to one of said lead wires, said tubular bar being made of metal and grounded and a push button extending through said hand grip and connected to the opposite or free end of the metal spring of said switch whereby the latter may be at times brought into electrical contact with said bar for causing said lamp to glow and the light rays thereof to emit therefrom and pass through said translucent hand grip.

5. An electrical signaling device for cycles having a tubular handle bar, said tubular handle bar having an arrow shaped light emitting opening therein, a socket arranged within said bar, a lamp mounted within said socket having a supply of electric energy, a hand grip permanently secured to said bar, a lense arranged within said hand grip and extending over the arrow shaped opening within said bar, and a control switch mounted within said hand grip for controlling the supply of electrical energy to said lamp.

6. An electrical signalling device for cycles having a tubular handle bar, said bar having light emitting openings in the side walls thereof, a socket permanently mounted within said bar, a lamp mounted within said socket having a supply of electrical energy, a hand grip secured to and encasing said bar and said hand grip having arrow shaped light emitting openings therein registering with the openings in the side walls of said bar whereby the rays of light from said lamp may pass therethrough and emit therefrom.

TAGE ARNOLD DAVIDSSON.

REFERENCES CITED

The following references are of record in the file of this patent:

FOREIGN PATENTS

| Number | Country | Date |
|---|---|---|
| 147,667 | Austrian | Nov. 10, 1936 |
| 165,014 | Swiss | Jan. 2, 1932 |
| 663,657 | German | Aug. 11, 1938 |